(12) United States Patent
Mekid

(10) Patent No.: US 9,833,844 B2
(45) Date of Patent: Dec. 5, 2017

(54) DESKTOP MILLING MACHINE WITH OVATE-SHAPED BRIDGE

(71) Applicant: KING FAHD UNIVERSITY OF PETROLEUM AND MINERALS, Dhahran (SA)

(72) Inventor: Samir Mekid, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 15/184,351

(22) Filed: Jun. 16, 2016

(65) Prior Publication Data
US 2016/0288220 A1 Oct. 6, 2016

Related U.S. Application Data

(62) Division of application No. 14/050,247, filed on Oct. 9, 2013, now abandoned.

(51) Int. Cl.
*B23C 1/06* (2006.01)
*B23Q 1/01* (2006.01)
(Continued)

(52) U.S. Cl.
CPC ............... *B23C 1/20* (2013.01); *B23C 1/002* (2013.01); *B23C 1/06* (2013.01); *B23Q 1/012* (2013.01); *B23Q 1/015* (2013.01); *G05B 19/4099* (2013.01); *G05B 2219/45145* (2013.01); *G05B 2219/49006* (2013.01); *Y10T 409/30868* (2015.01); *Y10T 409/307728* (2015.01);
(Continued)

(58) Field of Classification Search
CPC . Y10T 409/307728; Y10T 409/308288; Y10T 409/309576; B23C 1/002; B23Q 1/012; B23Q 1/01; B23Q 1/015; B23Q 1/017; B23B 39/006
USPC ......................................... 409/202, 212, 235
See application file for complete search history.

(56) References Cited

U.S. PATENT DOCUMENTS 1,991,285 A * 2/1935 Lindner ................. B23Q 1/012
144/48.3
2,042,720 A * 6/1936 Lindner ................. B23Q 1/012
408/235
(Continued)

FOREIGN PATENT DOCUMENTS

CN          102152130 A * 8/2011
DE          2150947 A1 * 4/1973
(Continued)

OTHER PUBLICATIONS

Machine Translation CN 102152130, which CN '130 was published Aug. 2011.*
(Continued)

*Primary Examiner* — Erica E Cadugan
(74) *Attorney, Agent, or Firm* — Oblon, McClelland, Maier & Neustadt, L.L.P.

(57) ABSTRACT

The desktop milling machine with an ovate-shaped bridge is a desktop milling machine of the computer numerical control (CNC) type having a portion of the bridge or frame structure configured to alleviate bridge deflections and deformations that are caused during the high-speed milling processes. Preferably, the bridge has an ovate arch, or has a rear face having an ovate contour.

8 Claims, 3 Drawing Sheets

(51) Int. Cl.
*B23C 1/20* (2006.01)
*B23C 1/00* (2006.01)
*G05B 19/4099* (2006.01)

(52) U.S. Cl.
CPC ............ *Y10T 409/309576* (2015.01); *Y10T 409/309912* (2015.01)

(56) References Cited

U.S. PATENT DOCUMENTS

| | | | |
|---|---|---|---|
| 2,576,341 A | | 11/1951 | Hanitz |
| 3,998,127 A | * | 12/1976 | Romeu ............... B23C 1/14 408/234 |
| 5,688,084 A | * | 11/1997 | Fritz .................. B23Q 1/03 310/13 |
| 6,935,003 B2 | | 8/2005 | Rahman et al. |
| 2011/0280680 A1 | * | 11/2011 | Park .................. B23Q 1/44 409/211 |

FOREIGN PATENT DOCUMENTS

| | | | |
|---|---|---|---|
| DE | 10051296 A1 | * | 4/2002 |
| FR | 1369538 A | * | 8/1964 |

OTHER PUBLICATIONS

Machine Translation FR 1369538, which FR '538 was published Aug. 1964.*

* cited by examiner

US 9,833,844 B2

DESKTOP MILLING MACHINE WITH OVATE-SHAPED BRIDGE

CROSS-REFERENCE TO RELATED APPLICATIONS

This application is a divisional application of U.S. patent application Ser. No. 14/050,247, filed on Oct. 9, 2013, now abandoned.

BACKGROUND OF THE INVENTION

1. Field of the Invention

The present invention generally relates to machine tools, and particularly to a desktop milling machine with an ovate-shaped bridge.

2. Description of the Related Art

Micro-scale (and meso-scale) components have generally been produced by conventional machine tools. Since by definition micro components are small, the dimensional tolerance allowances would also be small, thereby creating a high incidence of error when utilizing conventional machine tools to manufacture the micro components. To alleviate these errors, relatively small computer numerical control (CNC) desktop milling machines have been employed to manufacture micro components. The use of these desktop milling machines has greatly reduced manufacturing errors in the production of micro components, saving both time and money. However, the high speed manufacturing techniques performed by the desktop machine produce high-frequency induced loads and temperature rises that can cause distorting resonances in the frame or bridge of the machine.

The major problem that may result from the resonances is that the disturbance set up in the bridge is also easily transferable through relatively weak joints back onto the spindle and tool assembly, which are supported on the bridge, causing deformations. Although such deformations might be slight, they have a high impact on the accuracy of a micro-milling procedure. The effect of this on the already complex dynamics of the spindle-tool system may be enough to cause bad surface quality, chatter, and tool breakage.

Hence, it is important that the bridge has higher natural frequencies and stiffness to resist these deformation resonances. A design that would produce a bridge that has a higher natural frequency than the related art bridges would alleviate the effect of the distorting resonances and would greatly enhance the efficiency of the desktop milling process. Thus, a desktop milling machine with an ovate-shaped bridge solving the aforementioned problems is desired.

SUMMARY OF THE INVENTION

The desktop milling machine with an ovate-shaped bridge is a desktop milling machine of the computer numerical control (CNC) type having a bridge or frame structure designed to alleviate bridge deflections and deformations that are caused during the high-speed milling processes. In a preferred embodiment, the bridge is formed with an opening for receiving a work piece or micro-component therein during the milling process. The opening is of an ovate or egg-shaped configuration. A second embodiment provides an ovate contour in a vertical wall of the bridge. It has been determined that the ovate design of the bridge creates a structure that has a higher natural frequency than other milling machine bridges and greatly reduces the incidence of bridge-deforming resonances. The front face of the bridge structure supports the high-speed spindle and removable milling tools, as is conventional in the art.

Accordingly, the invention presents a desktop milling machine that is configured to minimize manufacturing errors that may arise during the milling process. The milling machine is stable, rugged and dependable. The invention provides for improved elements thereof in an arrangement for the purposes described that are inexpensive, dependable and fully effective in accomplishing their intended purposes.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
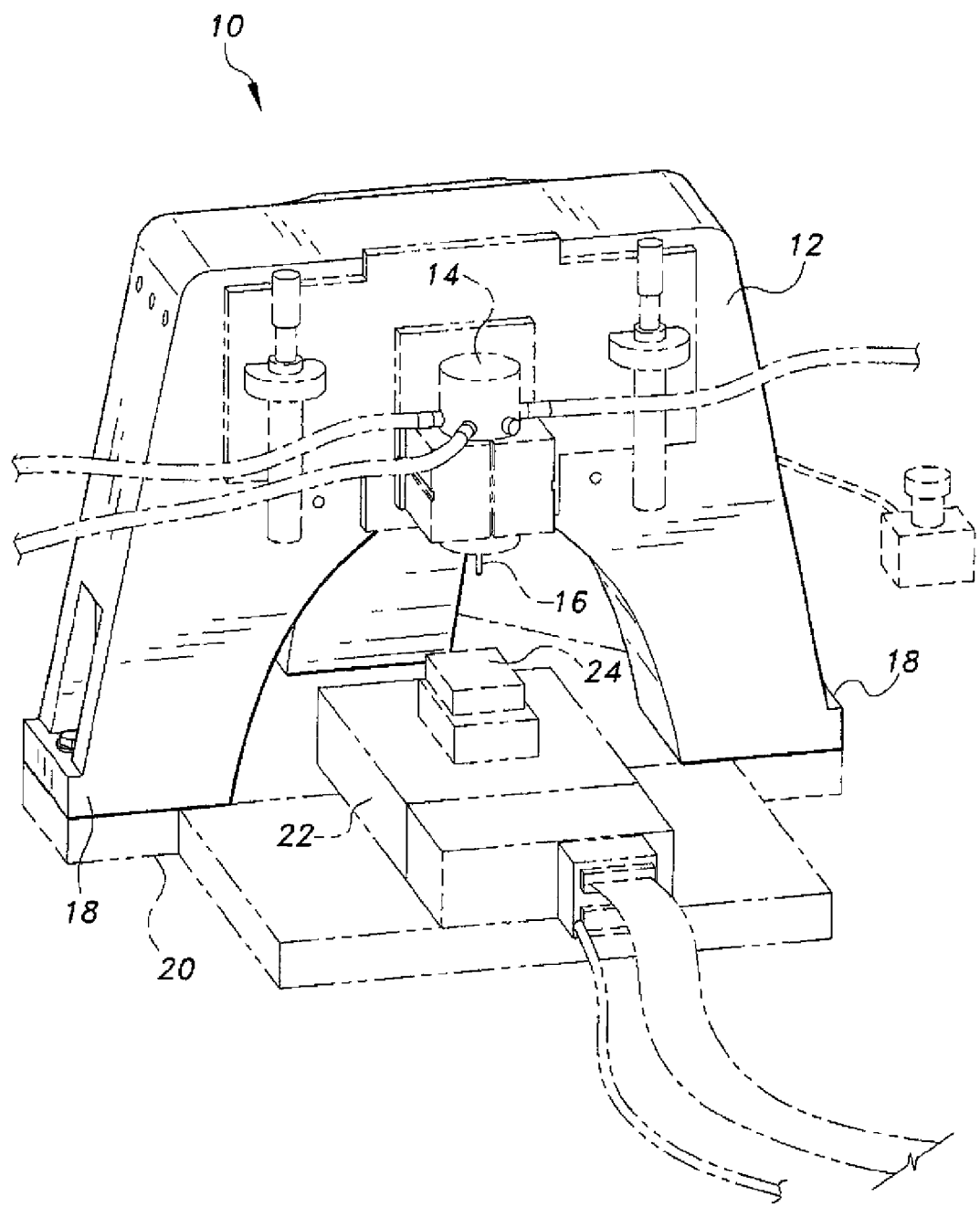
FIG. 1 is an environmental, perspective view of a first embodiment of a desktop milling machine with an ovate-shaped bridge according to the present invention.
Figure 2:
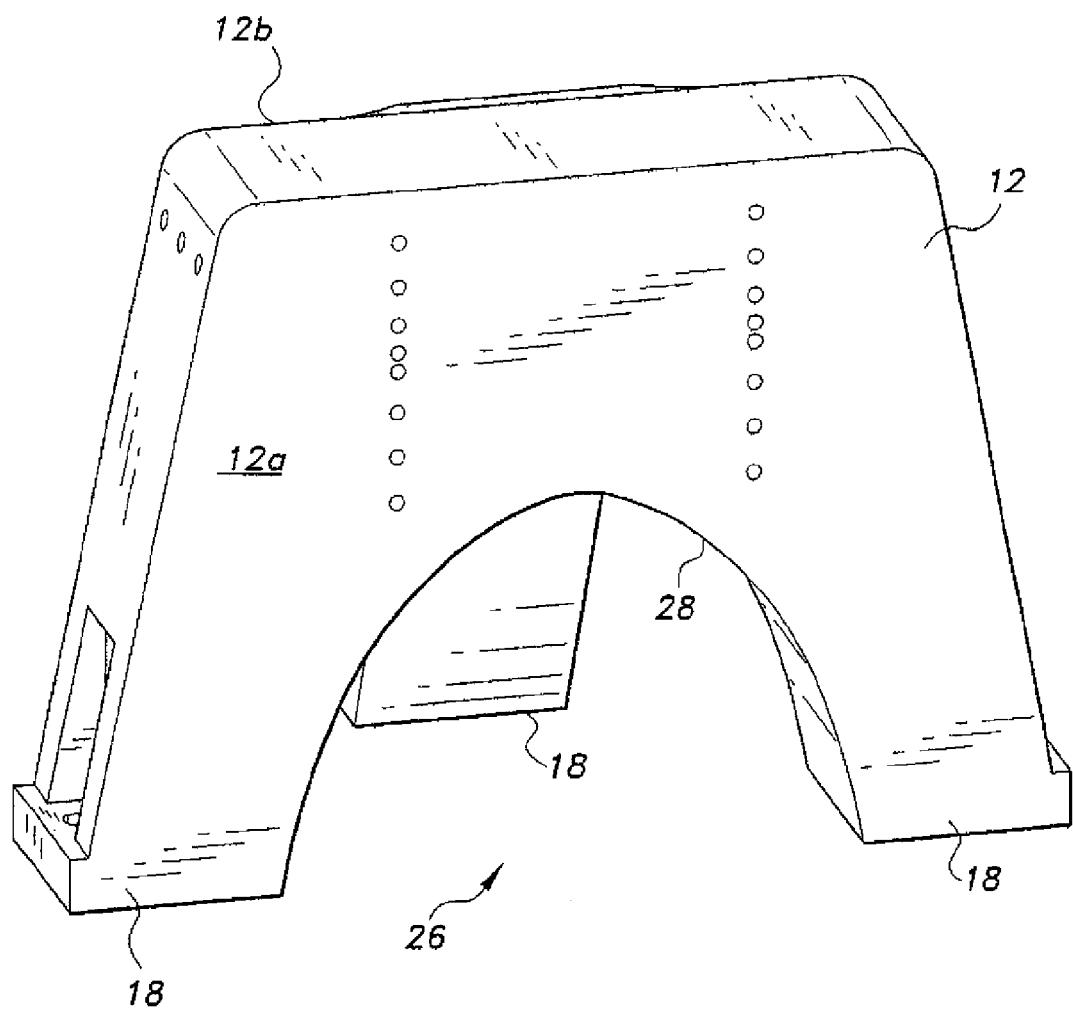
FIG. 2 is a perspective view of a first embodiment of the frame of a desktop milling machine with an ovate-shaped bridge according to the present invention.

With reference to FIGS. 1 and 2, the desktop milling machine with ovate-shaped bridge is generally indicated at 10. The milling machine 10 comprises a bridge or frame structure 12, which has a front face 12a and a rear face 12b. A high speed spindle 14 is mounted on the front face 12a. A work tool 16 is removably mounted to the high speed spindle 14. As is well known, spindle 14 is preferably selectively vertically adjustable and movable along a controlled axis by any suitable type of vertical mount or mechanism. The work tool 16 may be one of many types, such as a grinder, polisher, drill, etc. The bridge 12 comprises three support legs 18 that are preferably bolted to a platform 20. A workpiece holder 22 is positioned on the platform 20 and is movable thereon. A workpiece (micro component) 24 is removably clamped in the workpiece holder. An opening 26 is cut out of the bridge 12, which provides space for manipulating the workpiece holder 22 and workpiece 24 in proper alignment with the tool 16 when performing a milling procedure. The opening 26 is defined by a continuous wall 28 and has an ovate configuration. As pointed out above, this configuration has been determined to provide stability for the frame and minimize the effects of bridge deformation due to resonance forces produced when performing a milling procedure. As is well known in the art, the workpiece holder 22 is preferably mounted on an X-Y table, allowing for two-dimensional horizontal adjustment of the workpiece 24 with respect to the milling machine.

Figure 3:
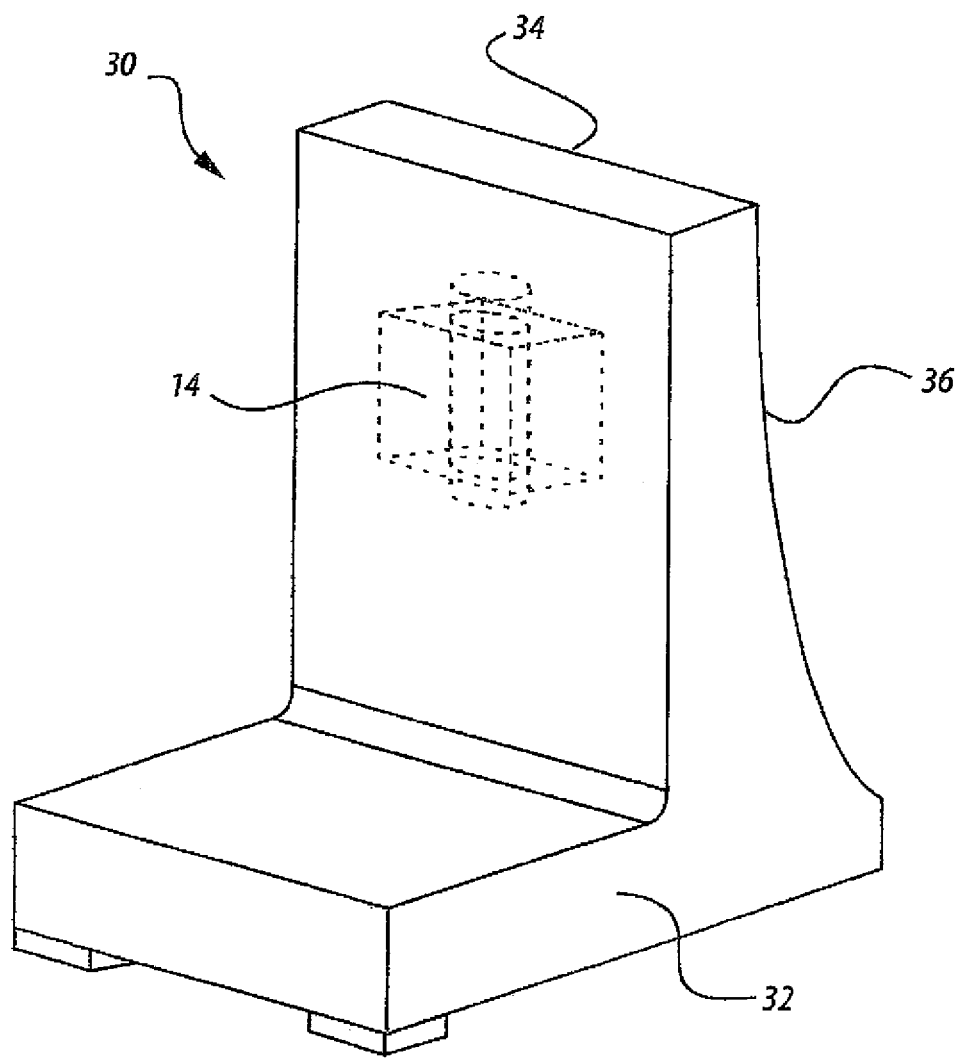
FIG. 3 is a perspective view of a second embodiment of the frame of a desktop milling machine with an ovate-shaped bridge according to the present invention.

In the embodiment as shown in FIG. 3, the bridge 30 is L-shaped in profile, having a work-holding platform 32. A bridge wall 34 is mounted on the platform 32 and rises vertically therefrom. A high-speed spindle 14 (shown in phantom lines) is mounted on the front face of the bridge wall 34. The rear wall, or rear face of the bridge wall 34, is of an ovate configuration 36. As in the previous embodiment, high-speed spindle 14 is preferably selectively vertically adjustable and movable. Further, as in the previous embodiment, the platform 32 preferably supports an X-Y stage for selective horizontal movement of the workpiece along two orthogonal axes.

It is to be understood that the present invention is not limited to the embodiments described above, but encompasses any and all embodiments within the scope of the following claims.

I claim:

1. A desktop milling machine, comprising:
   a bridge member having a front face and a rear face, an opening being formed through the bridge member through the front and rear faces, the opening having an ovate contour;
   a platform, the bridge member being supported on the platform; and
   a milling machine spindle mounted on the front face of the bridge member,
   the bridge member comprising two legs and a connecting portion, the two legs extending upwards from the platform, the two legs connected by and supporting the connecting portion,
   wherein the ovate contour is curved over an entire length thereof, extends upwards from the platform, and defines a respective curved side of each of the two legs.

2. The desktop milling machine according to claim 1, wherein said milling machine spindle is vertically adjustable.

3. The desktop milling machine according to claim 1, further including a third leg, formed on said bridge member and supporting said bridge member on said platform.

4. The desktop milling machine according to claim 1, wherein the desktop milling machine is a computer numerical control (CNC) milling machine.

5. A desktop milling machine, comprising:
   a bridge member having a front face and a rear face, an opening formed through the bridge member through the front and rear faces, the opening having an ovate contour;
   a platform, the bridge member being supported on the platform and bolted thereto;
   a milling machine spindle mounted on the front face of the bridge member, the opening being positioned beneath the milling machine spindle,
   the bridge member comprising two legs and a connecting portion, the two legs extending upwards from the platform, the two legs connected by and supporting the connecting portion,
   wherein the ovate contour is curved over an entire length thereof, extends upwards from the platform, and defines a respective curved side of each of the two legs.

6. The desktop milling machine according to claim 5, further comprising a workpiece holder, wherein said workpiece holder is horizontally adjustable along two orthogonal axes.

7. The desktop milling machine according to claim 5, further including a third leg formed on said bridge member and supporting said bridge member on said platform.

8. The desktop milling machine according to claim 5, wherein the desktop milling machine is a computer numerical control (CNC) milling machine.

* * * * *